(12) United States Patent
Maeta et al.

(10) Patent No.: US 8,128,135 B2
(45) Date of Patent: Mar. 6, 2012

(54) LOCK DEVICE FOR A VEHICLE

(75) Inventors: Kenji Maeta, Kariya (JP); Kouji Kondoh, Toyota (JP); Takuya Mizuno, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 528 days.

(21) Appl. No.: 12/328,201

(22) Filed: Dec. 4, 2008

(65) Prior Publication Data

US 2009/0145183 A1    Jun. 11, 2009

(30) Foreign Application Priority Data

Dec. 7, 2007 (JP) ................................. 2007-317009

(51) Int. Cl.
*E05C 3/06* (2006.01)
*E05C 3/16* (2006.01)

(52) U.S. Cl. .................... 292/216; 292/201; 297/378.13; 297/336

(58) Field of Classification Search .................. 292/216, 292/201, DIG. 23, DIG. 42, DIG. 14; 297/335–336, 297/378.11, 378.12, 378.13, 367 R; 296/65.03, 296/65.05, 65.12

See application file for complete search history.

(56) References Cited

U.S. PATENT DOCUMENTS

| | | | | |
|---|---|---|---|---|
| 3,905,624 | A * | 9/1975 | Fujita | 292/11 |
| 4,865,377 | A * | 9/1989 | Musser et al. | 296/65.03 |
| 6,012,747 | A * | 1/2000 | Takamura et al. | 292/216 |
| 6,123,379 | A * | 9/2000 | Yamada et al. | 296/65.03 |
| 6,945,585 | B1 | 9/2005 | Liu et al. | |
| 7,404,605 | B2 * | 7/2008 | Inoue et al. | 297/378.13 |
| 7,631,907 | B2 * | 12/2009 | Sato | 292/216 |
| 7,740,217 | B2 * | 6/2010 | Prowe | 248/311.2 |
| 2005/0269854 | A1 * | 12/2005 | Lutzka et al. | 297/378.13 |
| 2007/0205612 | A1 * | 9/2007 | Graute | 292/216 |

* cited by examiner

*Primary Examiner* — Carlos Lugo
*Assistant Examiner* — Mark Williams
(74) *Attorney, Agent, or Firm* — Oblon, Spivak, McClelland, Maier & Neustadt, L.L.P.

(57) ABSTRACT

A lock device for a vehicle includes a base plate provided with an entrance/retracting groove for receiving or retracting a striker and a latch pivotally supported on the base plate by a latch axis. The latch includes a lock groove engaging with or disengaging from the striker entering the entrance/retracting groove and rotatable between a lock release position allowing the striker entering into the entrance/retracting groove and a lock position for holding the striker in the entrance/retracting groove by the movement of the striker. A first biasing member is provided for biasing the latch in the rotational direction to the release position to bias the pawl in a rotational direction towards the release preventing position and a second biasing member is provided for biasing the rotation plate in a rotational direction towards the release position of the latch.

15 Claims, 8 Drawing Sheets

LOCK DEVICE FOR A VEHICLE

CROSS REFERENCE TO RELATED APPLICATIONS

This application is based on and claims priority under 35 U.S.C. §119 to Japanese Patent Application 2007-317009, filed on Dec. 7, 2007, the entire contents of which is incorporated herein by reference.

FIELD OF THE INVENTION

The present invention relates to a lock device for a vehicle, and more particularly, to a seat lock device used for locking a vehicle seat to a vehicle fixed portion such as a vehicle floor, a door lock device used for locking a vehicle door to a vehicle body, or a lid lock device used for locking an engine hood rid, a luggage room (trunk room) cover rid or a fuel tank rid to an appropriate portion of the vehicle body.

BACKGROUND

In an automobile, in order to widely use a compartment space of the vehicle, the seat is structured to be detachable from the vehicle floor or the seat back portion is structured to be reclined relative to the seat cushion. The reclining seat device or the detachable seat device is normally fixed to a vehicle fixed portion, such as a vehicle sidewall portion or the vehicle floor so as not to generate any noise that may influence on a vehicle comfort. In addition, a stout lock device is provided for preventing any unexpected release of the lock by an impact caused by a vehicle collision.

For example, a conventional door lock device 24 (numerals here are recited from a patent document 1 (specification and drawings of U.S. Pat. No. 6,945,585) is disclosed as shown in FIG. 3 or 4 of the document. The door lock device 24 of the document is fixed underneath a seat 10 and is engaged with a striker 29 fixed to a vehicle floor 20. In more detail, a side plate member 32 having an entrance/retracting groove is fixed underneath a seat member 22. The striker 29 is engaged with the entrance/retracting groove for locking. A latch 40 and a pawl 70 are rotationally supported on the side plate 32 and a spring force generated by a tension spring 78 gives each member a rotational force in opposite direction with each other. The striker 29 having entered into the groove of the side plate member 32 pushes a rear side groove surface of a lock groove 46 to rotate the latch 40 in a locking direction overcoming the spring force of the tension spring 78. Then a lock surface of the pawl 70 engages with the lock portion of the latch 40 to prevent the latch from rotating in a lock release direction. Under the locked position, the seat 10 is fixed to the vehicle floor 20 by firmly enclosing the striker 29 between the front side groove surface of the lock groove 46 and the bottom surface of the entrance/retracting groove of the side plate member 32.

In order to fittingly engage the striker with the latch 40 under the locked position, a cam member 48 is lineally movably installed and is biased by a return spring 54 in an opening direction of the lock groove 46. An inclined cam surface 52 is provided on the cam member 48 along the front side groove surface and accordingly when the cam member 48 advances by the force of return spring 54, the inclined cam surface 52 moves into the lock groove 46 to be firmly in contact with the striker 29 so that any chattering noise can be eliminated.

According to the lock device mentioned above (the patent document 1), it is necessary for the cam member 48 to be retracted in accordance with the rotation of the latch 40. This is because the cam member 48 is installed on the latch 40. If the inclination angle of the cam surface is small, the retracting movement of the cam member may be interrupted. Accordingly, it is necessary to provide a wide range inclination angle on the cam surface 52, which leads to a large pressing angle of the cam surface 52 on the striker 29 and when a force is applied on the cam surface 52 from the striker 29, the cam member 48 may retreat to loosen the engagement with the striker. The loosened engagement may lead to a generation of chattering noise.

Further, in the lock device according to the patent document 1, after the pawl 70 is disengaged from the latch 40, when the striker 29 is released from the lock device 24, the latch 40 is rotated keeping the firm engagement of the striker 29 with the cam surface 52 and the bottom surface of the entrance/retracting groove. This will need a greater force for disengaging the striker 29 from the lock device 24.

A need thus exists for a lock device, which is not susceptible to the drawback mentioned above.

SUMMARY OF THE INVENTION

A lock device for a vehicle according to the present invention includes a base plate fixed to one of a fixed member and a movable member and provided with an entrance/retracting groove for receiving or retracting a striker fixed to the other of the fixed member and the movable member, a latch pivotally supported on the base plate by a latch axis arranged in an axial direction, the latch includes a lock groove engaging with or disengaging from the striker entering the entrance/retracting groove and is rotatable between a lock release position allowing the striker entering into the entrance/retracting groove and a lock position for holding the striker in the entrance/retracting groove by the movement of the striker. The lock device further includes a pawl rotationally supported on the base plate by a pawl axis arranged apart from the latch axis for keeping the latch to a releasable position for allowing the latch to be returning to the lock release position in a rotational range of the latch from the lock release position to the lock position and preventing the latch to return to the lock release position by engaging with the latch rotating to a release preventing position after the latch having been rotated to the lock position, a rotation lever rotationally supported on the base plate in association with the pawl, rotation plate rotationally supported on the base plate coaxially with the latch axis and being rotated in a direction same with the rotation direction of the latch towards the lock position engaging with the rotation lever upon the pawl being rotated from the release preventing position to the releasable position, a thrust plate having an inclined cam surface extending in a crossing direction of the striker entering direction adjacent a bottom surface of the entrance/retracting groove and loosely supported on the base plate through a guide portion provided on the base plate and moving the inclined cam surface into the entrance/retracting groove by connecting the plate with a guide portion provided on the base plate to secure the striker between the inclined cam surface and the latch, a first biasing means for biasing the latch in the rotational direction to the release position to bias the pawl in a rotational direction towards the release preventing position and a second biasing means for biasing the rotation plate in a rotational direction towards the release position of the latch. The thrust plate includes an inclined cam surface extending in a crossing direction of the striker entering direction adjacent a bottom surface of the entrance/retracting groove and is loosely supported on the base plate through a guide portion provided on the base plate and moving the inclined cam surface into the entrance/retracting groove by connecting the plate with a guide portion provided on the base plate to secure the striker between the inclined cam surface and the latch.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
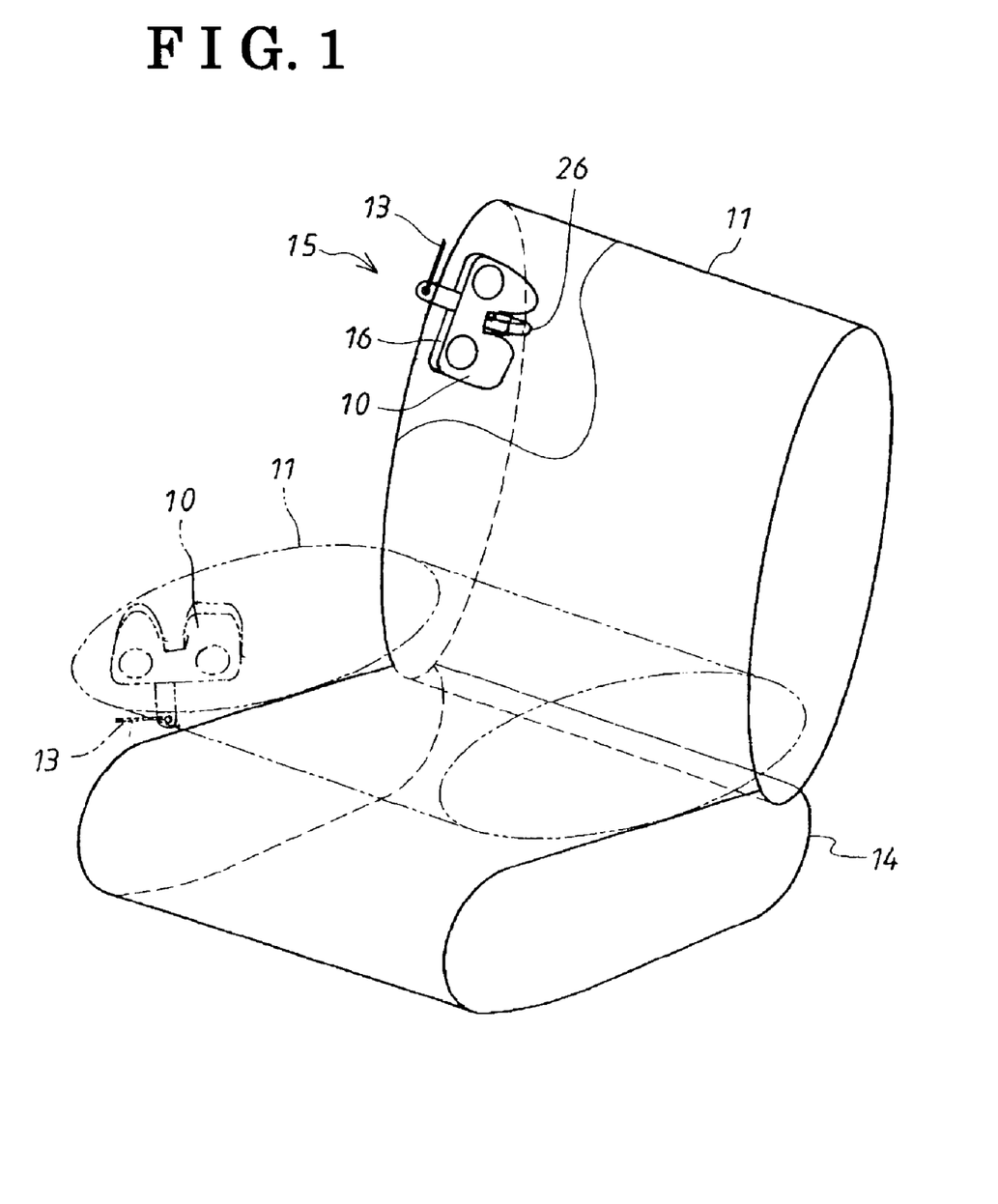
FIG. 1 is a perspective view of a lock device according to an embodiment of the invention which is installed in a vehicle rear seat.

The detail of the lock device used in a vehicle according to the invention will be explained herein after with the attached drawings. As shown in FIG. 1, a lock device 10 is fixed to a side frame of a seat back 12 (movable member) of a rear seat 11 through a base plate 16. The seat back 12 is movable relative to a seat cushion 14 of the seat 11. A striker 26 is fixed to an inner side of a vehicle body (fixed member). The striker 26 engages with the lock device 10 when the seat back 12 is moved upright. The striker and the lock device 10 form a vehicle lock device 15. The vehicle lock device 15 is locked when the lock device 10 engages with the striker 26 under the seat back being in an upright position. The locked position is released by operating an operation lever 13 attached to the lock device 10 for allowing the seat back to be forwardly inclined (folded) relative to the seat cushion 14 of the seat 11. The inclined or folded position of the seat back 12 is shown in FIG. 1 with a two-dot chain line.

Figure 2:
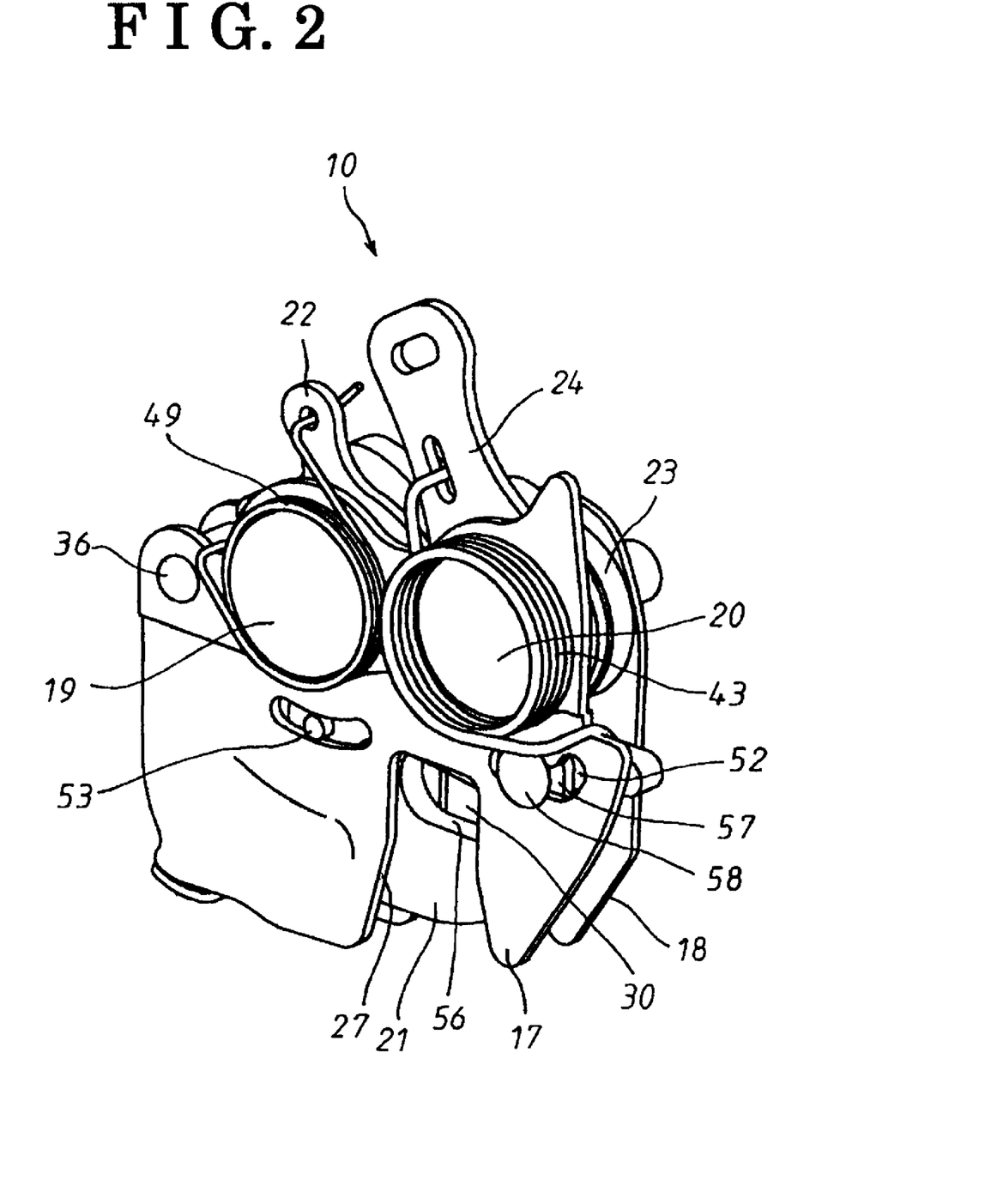
FIG. 2 is a detail perspective view of the lock device shown in FIG. 1.
Figure 3:
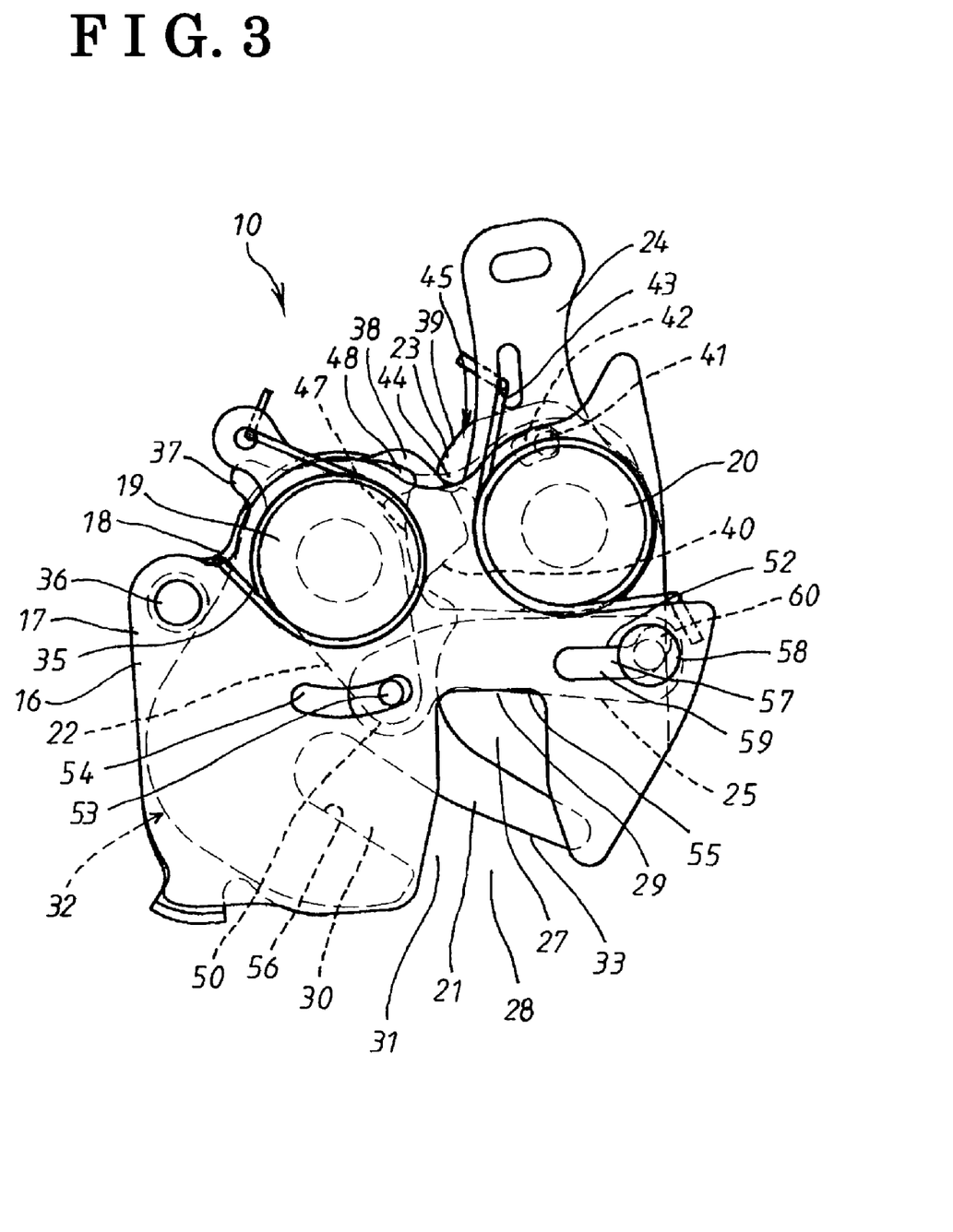
FIG. 3 is a plane view of the lock device shown in FIG. 2.
Figure 4:
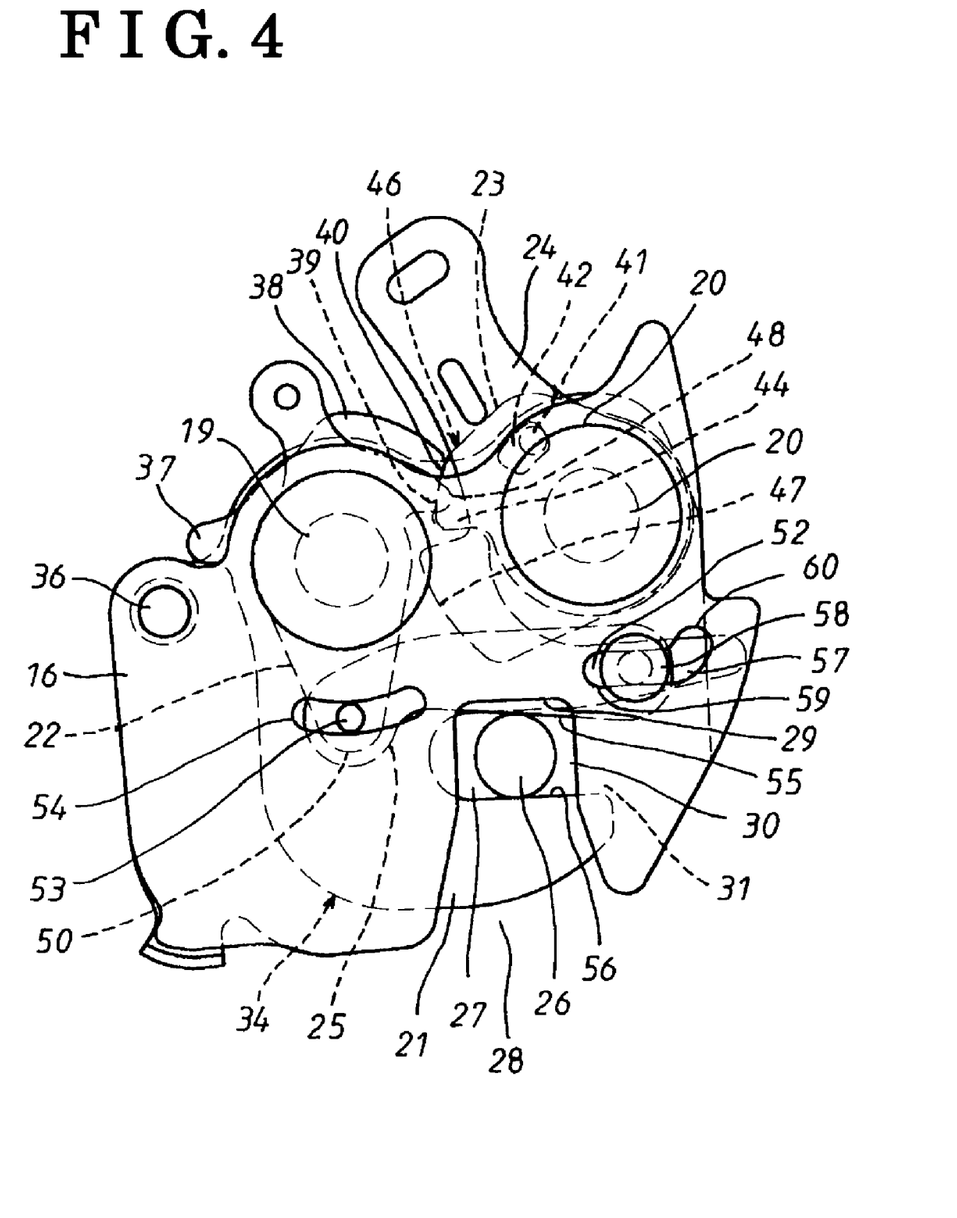
FIG. 4 is a view similar to FIG. 2 but showing the lock device under a locked position.
Figure 5:
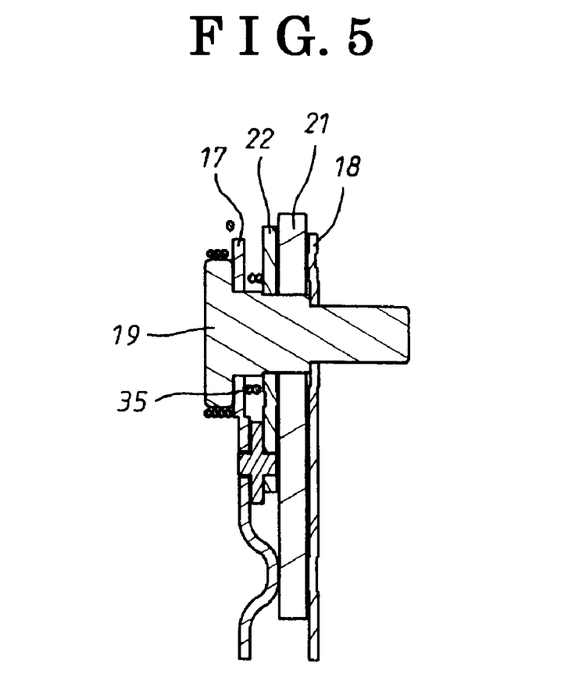
FIG. 5 is a partial cross sectional view taken along the line connecting the latch pivotal axis and a pin.
Figure 6:
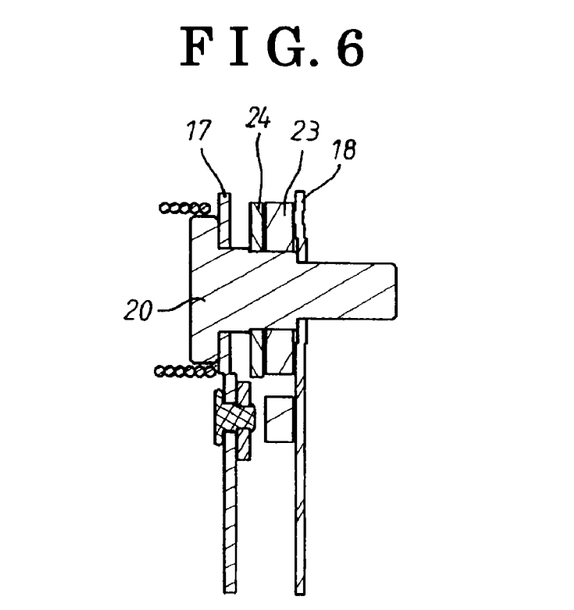
FIG. 6 is a partial cross sectional view similar to FIG. 5, but taken along the line connecting the pawl pivotal axis and a sliding pin.

As shown in FIG. 2 through FIG. 4, the lock device 10 includes the base plate 16. The base plate 16 includes a first plate 17 and a second plate 18. The first and the second plates 17 and 18 are connected in parallel with each other having a predetermined distance therebetween through a latch axis 19, a pawl axis 20 and a spring receiving axis 36. A latch 21 and a rotation plate 22 are coaxially arranged and rotationally supported by the latch axis 19 between the first and the second plates 17 and 18 as shown in FIG. 5. A pawl 23 and a rotation lever 24 are coaxially arranged and rotationally supported by the pawl axis 20 as shown in FIG. 6. A thrust plate 25 is supported by the pawl axis 20 and movable in a straight line relative to the pawl axis 20. The latch axis 19 and the pawl axis 20 crossed with the base plate 16 in an axial direction and are positioned rear side of the base plate 16 having a space in a longitudinal direction. The latch 21 and the pawl 23 positioned in the same plane, whereas the rotation plate 22 and the rotation lever 24 are positioned in the same plane.

The first and second plates 17 and 18 are provided with entrance/retracting grooves 27 for allowing the striker 26 to be entered in or retracted from. Each groove 27 on the first and the second plates is positioned frontward opposite to the positions of the latch axis 19 and the pawl axis 20. The grooves 27 are formed in a crosswise direction with a right angle in the lengthwise direction. Each groove 27 includes entrance opening 28 open along one marginal side of the first and the second plates 17 and 18 extending in a crosswise direction. Each groove 27 has a bottom surface 29 with a predetermined depth. As shown in FIG. 5, the latch axis 19 includes a flanged portion, large diameter portion, an intermediate diameter portion and a small diameter portion. The large diameter portion and the small diameter portion of the latch axis 19 are engaged with holes provided in the first and the second plates 17 and 18, respectively, and a stepped surface formed by the flanged portion and the large diameter portion and a stepped surface formed by the intermediate diameter portion and the small diameter portion are in contact with the first and the second plates 17 and 18. Under this engagement and contact state, the first and the second plates are welded. The latch 21 and the rotation plate 22 are rotationally supported at the intermediate diameter portion of the latch axis 19. The latch 21 and the rotation plate 22 are movable between the stepped surface formed by the large diameter portion and the intermediate diameter portion and the second plate 18.

As shown in FIG. 3 or 4, a lock groove 30 is provided on the latch 21 and the striker 26 enters into or retracts from the groove 30 for engaging with or disengaging from the latch 21 for locking or unlocking operation. An extension portion 38 is provided in a radial direction at the rearward of the lock groove 30 as viewed in a clockwise direction. The lock groove 30 includes a rear side groove surface 33 positioned at the bottom surface 29 side of the groove 27, a front side groove surface 56 opposing the rear side groove surface 33 and an opening 31 for entering the striker 26 therein. Outer periphery of the extension portion 38 is co-centrically formed with the latch axis 19 and a tip end of the extension portion 38 in a clockwise direction is provided with a cam surface 40 which contacts with a preventing surface 39 of the lock groove 30. The latch 21 is rotational between a release position 32 (the position shown in FIG. 3) where the opening 31 of the lock groove 30 is in alignment with the entrance opening 28 and a locked position 34 (the position shown in FIG. 4) where the lock groove 30 is positioned with a right angle relative to the groove 27 by the pushing movement of the striker 26 entered into the groove 27 on the rear side groove surface 33 of the lock groove 30. As shown in FIG. 3 and FIG. 5, the latch 21 is biased toward the release position 32 in the clockwise direction (direction same as the rotational direction for releasing the lock) by the return spring 35 wound around the latch axis 19. A spring receiving axis 36 penetrates through the first and second plates 17 and 18 at a corner portion close to the latch axis 19 and is fixed to the plates by welding. One end of the return spring 35 is engaged with the spring receiving axis 36 and the other end thereof is engaged with a projection 37 provided on the latch 21. The latch 21 is biased in clockwise direction by the return spring 35 and stopped at the release position 32 by the contact of the rear portion of the latch 21 with the spring receiving axis 36.

As shown in FIG. 2 or 3, a pawl axis 20 is fixed to the base plate 16 between the first and the second plates with a space apart from the latch axis 19 in crosswise direction. A pawl 23 is rotationally supported by the pawl axis 20 in the same plane area with the latch 21. Further, similarly with the pawl 23, a rotation lever 24 is rotationally supported by the pawl axis 20. A pin 41 is provided on the pawl 23 and engaged with a circular hole 42 formed on the rotation lever 24 and arranged co-centrically with pawl axis 20. The rotation lever 24 is relatively rotated by a predetermined angle relative to the pawl 23 in association with the movement thereof.

As shown in FIG. 6, the pawl axis 20 includes a flanged portion, large diameter portion, an intermediate diameter portion and a small diameter portion. The large diameter portion and the small diameter portion of the pawl axis 20 are engaged with holes provided in the first and the second plates 17 and 18, respectively and a stepped surface formed by the flanged portion and the large diameter portion and a stepped surface formed by the intermediate diameter portion and the small diameter portion are in contact with the first and the second plates 17 and 18. Under this engagement and contact state, the first and the second plates are fixedly connected by welding or the like. The pawl 23 and the rotation lever 24 are rotationally supported at the intermediate diameter portion of the pawl axis 19. The pawl 23 and the rotation lever 24 are movable between the stepped surface formed by the large diameter portion and the intermediate diameter portion and the second plate 18. A preventing portion 44 is provided on the pawl 23 in a radial direction and the preventing portion 44 is engaged over the extension portion 38 during the latch 21 rotations from the release position 32 to the locked position 34. A preventing surface 39 is provided at the rear end of the preventing portion 44 in the counterclockwise direction. A male screw portion is provided at each small diameter portion of the latch axis 19 and the pawl axis 20. The lock device 10 is fixed to the base plate 16 by sandwiching the side frame of the seat back 12 between the nut screwed with the male screw portion and the second plate 18.

In FIG. 2 or 3, the rotation lever 24 is biased in a counterclockwise direction (same direction with a rotational direction towards a locking position of the latch) by a return spring 43 wound around the pawl axis. One end of the return spring 43 is engaged with a brim portion of the first plate 17 and the other end thereof is engaged with an elongated hole provided in the rotation lever 24. When the return spring 43 biases the rotation lever 24 in the counterclockwise direction, the pawl 23 is also biased in the counterclockwise direction through the engagement between the circular hole 42 and the pin 41. The rotation in the counterclockwise direction of the pawl 23 is prevented during the preventing portion 44 being in contact with the extension portion 38 of the latch 21 and is positioned at a lock releasable position 45 (position illustrated in FIG. 3). When the contact between the preventing portion 44 and the extension portion 38 due to the rotation of the latch 21, the pawl 23 is rotated to a lock release preventing position 46 (position illustrated in FIG. 4) by the spring force of the return spring 43. A pushing portion 47 is provided at the rotation lever 24 towards the rotation plate 22 in a radial direction.

Thus, the pawl keeps the lock releasable position 45 where the latch 21 can be returned to its release position 32 within a range between the release position 32 and the lock position 34 of the latch 21 and then is rotated to the lock preventing position 46 when the latch 21 is rotated to the lock position 34. Then the pawl 23 engages with the latch 21 to prevent the returning of the latch to the release position 32.

The rotation plate 22 is supported on the latch axis 19 and is accordingly rotationally supported on the base plate 16 coaxially with the latch 21. An engaging portion 48 is provided on the rotation plate 22 in a radial direction towards the rotation lever 24 side. When the rotation lever 24 is rotated in the clockwise direction to rotate the pawl 23 from the release preventing position 46 to the lock releasable position 45, the rotation plate 22 is rotated in the counterclockwise direction by the engagement between the engaging portion 48 of the rotation plate 22 and the pushing portion 47 of the rotation lever 24. In other words, the rotation plate 22 engages with the rotation lever 24 to be rotated in the same direction with the rotational direction of the latch towards the locked position 34 when the pawl 23 is rotated from the lock preventing position 46 to the lock releasable position 45.

In FIG. 2 or 3, the rotation plate 22 is biased in a clockwise direction by a return spring 49 wound around a flange portion of the latch axis 19. One end of the return spring 49 is engaged with a hole provided in the rotation plate 22 and the other end thereof is engaged with the brim portion of the first plate 17.

The rotation plate 22 is provided with an operation portion 50 movable in crosswise direction according to the rotation of the rotation plate 22 and is rotationally connected to one end of the thrust plate 25. The other end of the thrust plate 25 is supported by a guide portion 52 formed at the base plate 16 and is movably guided in a crosswise direction. The operation portion 50 is rotationally connected to the tip end of the thrust plate 25 by a connecting pin 53 at the latch axis side (opposite to the entrance/retracting groove 27 side). The connecting pin 53 is engaged with a circular groove 54 formed on the first plate 17 coaxially with the latch axis 19. The thrust plate 25 further includes an inclined cam surface 55 provided adjacent the bottom surface 29 of the groove 27 in a crosswise direction extending in a crossing direction with the moving direction of the striker 26 relative to the groove 27. The inclined cam surface 55 inclines towards the opening portion 28 of the groove 27 from the latch axis 19 side to the pawl axis 20 side with an inclination of 5 degree, for example. The inclined cam surface 55 entraps the striker 26 with the front side groove surface 56 in the groove 27 when the latch 21 is rotated to the locked position 34 by the striker 26 and the pawl 23 moves to the release preventing position 23 and when the rotation lever 24 is disengaged from the rotation plate 22. The rotation of the rotation plate 22 moves the inclined cam surface 55 into the groove 27 to enclose the striker 26 by the cam surface 55 and the latch 21 to firmly keep the locked position without any generation of chattering noise.

The first plate 17 is provided with an elongated guide hole 57 at the pawl axis 20 side opposite to the entrance/retracting groove 27. A slide pin 58 is secured to one end of the thrust plate 25 and is inserted into the guide hole 57. The elongated guide hole 57 includes a crosswise hole portion 59 guiding the rear end portion of the thrust plate 25 in a crosswise direction and an inclined hole portion 60 for receiving the thrust plate 25 when it moves away from the opening 28 of the groove 27. Thus the thrust plate 25 is loosely supported by the base plate 16 through the engagement of the slide pin 58 with the elongated hole 57 provided in the first plate 17.

A first biasing means is formed by the return springs 35 and 43 for biasing the latch 21 in the lock release direction to move the latch to the lock release position 32 and biasing the pawl 23 in the rotation direction to the lock release preventing position 46. A second biasing means is formed by the return spring 49 for biasing the rotation plate 22 in the direction same as the latch release direction to the release position 32 of the latch 21.

Next, operation of the vehicle lock device 15 according to one embodiment of the invention will be explained hereinafter. When the seat back 12 is reclined frontward and the lock device 10 is positioned at the release position as shown in FIG. 3, the latch 21 is biased in a clockwise direction by the spring 35. Then the backside of the latch 21 becomes in contact with the spring receiving axis 36 to be in the release position 32. The pawl 23 is biased in the counterclockwise direction by the force of spring 43 through the rotation lever 24. The preventing portion 44 overrides on the extension portion 38 to position the latch 21 at the releasable position 45. The rotation lever 24 is prevented its counterclockwise rotation by the engagement of the pin 41 with the circular hole 42 and the rotation plate 22 is rotated in the counterclockwise direction by the engagement of the engaging portion 48 with the pushing portion 47 to retract the thrust plate 25 to the retracting end portion.

Under this situation, when the seat back 12 is risen, the striker 26 relatively enters into the groove 27 to push the rear side groove surface 33 of the lock groove 30 to rotate the latch 21 in the counterclockwise direction until it reaches to the locked position 34. Since the pawl 23 is biased in the counterclockwise direction by the biasing force of spring 43 via the rotation lever 24, the extension portion 38 is disengaged from the preventing portion 44 by the rotation of the latch 21 and then the pawl 23 is rotated in the counterclockwise direction to the release preventing position 46 and the preventing surface 39 becomes in contact with the cam surface 40 to prevent the rotation of the latch 21 in the clockwise direction. The rotation lever 24 is also rotated in the counterclockwise direction together with the pawl 23 and the engagement between the pushing portion 47 and the engaging portion 48 is cancelled to rotate the rotation plate 22 in the clockwise direction by the force of spring 49.

The thrust plate 25 advances with the connecting pin 53 when the rotation plate 22 is rotated in the clockwise direction and the inclined cam surface 55 engages the striker 26 with the front side groove surface 56 of the lock groove 30. The pressure applied on the striker 26 by the pressure angle of the inclined cam surface 55 is set to be smaller (about 5 degree) so that the thrust plate 25 cannot retract from the groove by the engagement with the striker 26. The thrust plate 25 moves away from the opening 28 of the groove 27 by the sliding movement of the sliding pin 58 in the inclined hole 60 of the guide elongated hole 57. The cam surface 55 retracts to the position where the bottom surface 29 of the groove 27 positions. Under this situation, when the rotation plate 22 is rotated in the clockwise direction to advance the thrust plate 25. The thrust plate 25 is guided in the inclined hole 60 to move to the opening 28 side of the groove 27. This can increase the lateral movement of the inclined cam surface 55 relative to the crosswise movement of the thrust plate 25 so that the striker 26 can be secured firmly between the inclined cam surface 55 and the front side groove surface 56 of the lock groove 30 with a relatively small pressure angle even if the deviation of the lateral position or the diameter of the striker 26 is large. Under this situation, since the connecting pin 53 is engaged with the circular groove 54 formed in the first plate 17 of the base plate 16, a large force applied on the plate 25 towards the latch axis 19 can be received by the base plate 16 to reduce any possible damages on the rotation plate 22 and the latch axis 19.

Figure 7:
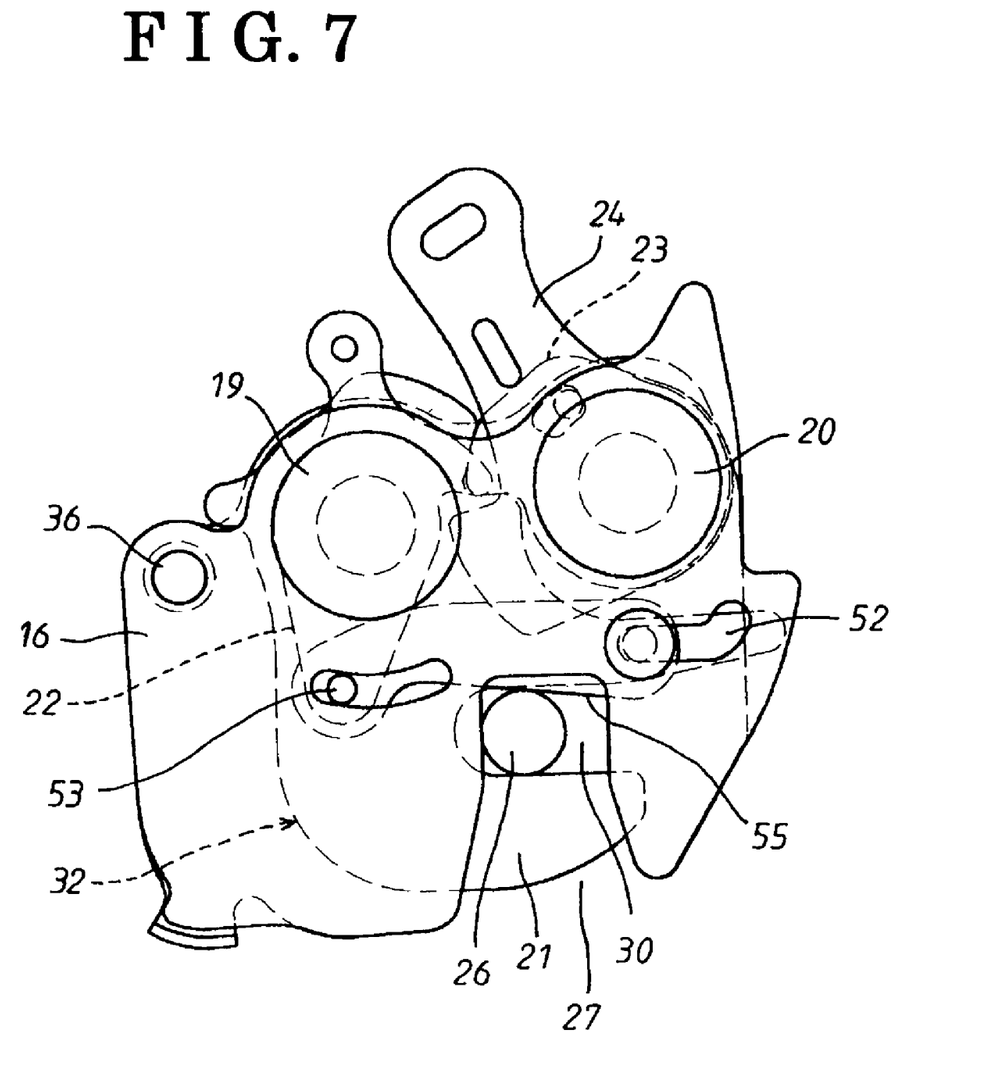
FIG. 7 is a view similar to FIG. 4, but showing the locked position of the lock device wherein a position under the striker is deviated in one direction.
Figure 8:
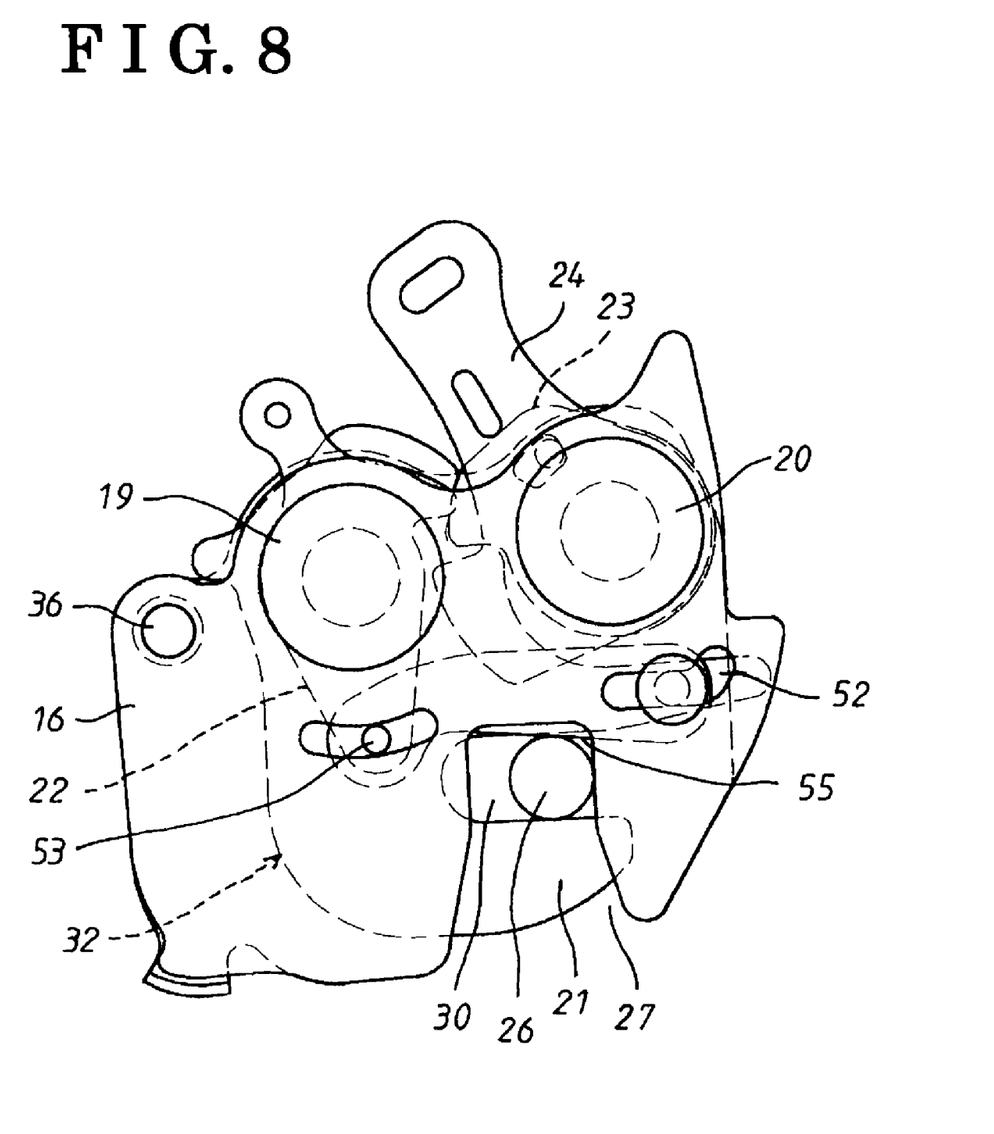
FIG. 8 is a view similar to FIG. 7, but showing the striker being deviated in the other direction.

FIG. 4 shows the striker 26 positioned at the central portion of the entrance/retracting groove 27 and firmly secured by the inclined cam surface 55 of the plate 25 and the front side groove surface 56 of the lock groove 30. FIG. 7 shows the striker 26 being deviated its position in the crosswise direction to the groove surface at the latch axis 19 side. According to the lock device 10 of this embodiment, the striker 26 can be firmly secured between the front side groove surface 56 of the lock groove 30 and the inclined cam surface 55 with a relatively small pressure angle by sufficiently moving the inclined cam surface 55 in a lengthwise direction by the crosswise advance movement of the thrust plate 25 under the deviated condition illustrated in FIG. 7. FIG. 8 shows the striker 26 being deviated its position to the groove surface at pawl axis 20 side of the entrance/retracting groove 27. As similar to the position in FIG. 7, the striker 26 can be locked firmly with a smaller pressure angle according to the lock device 10 of this embodiment. When the position of the striker 26 is not deviated in the crosswise direction and the vehicle lock device 15 is under the locked position, the pushing portion 47 of the rotation lever 24 is slightly separated from the engaging portion 48 of the rotation plate 22. The deviation direction and the amount of deviation change the separation amount of the striker 26 from the engaging portion 48 of the rotation plate 22.

Even if the deviation of the diameter of the striker 26 should occur, the thrust plate 25 moves to secure the striker between the front side groove surface 56 of the lock groove 30 and the inclined cam surface 55 depending on the deviation amount.

In order to release the locked condition of the lock device 10, the operation lever 13 is operated to rotate the rotation lever 24 in the clockwise direction overcoming the biasing force of spring 43. Then the circular hole 42 becomes in contact with the pin 41 to rotate the pawl 23 up to the lock releasable position 45. Since the rotation lever 24 only is rotated in the counterclockwise direction by a predetermined angle before the engagement of the circular hole 42 with the pin 41, the pushing portion 47 engages with the engaging portion 48 to rotate the rotation plate 22 in the counterclockwise direction to retract the plate 25 to release the striker 26 from the engagement of the inclined cam surface 55. Since the pressure angle formed by the inclined cam surface 55 and the striker 26 is set to be small, the force required for operation of the rotation lever 24 to rotate the rotation plate 22 can be set to be small to improve the operability. When the circular hole 42 is engaged with the pin 41 to rotate the pawl 23 in the clockwise direction, the preventing surface 39 of the pawl 23 can be smoothly disengaged from the cam surface 40 of the latch 21 with a small force. Thus the pawl 23 can be rotated by the rotation lever 24 to the releasable position 45 with a small operation force.

The latch 21 is rotated in the clockwise direction by the release of the cam surface 40 from the preventing surface 39 of the pawl 23. The striker 26 is released from the lock device 10 by moving from the opening 31 of the lock groove 30 and the entrance/retracting groove 27 to be in a free position. The seat back 12 is then reclined forward on to the seat cushion 14. The latch 21 is kept to the release position 32 by the force of return spring 35.

The first biasing means can be alternatively formed by a tension spring provided between the latch 21 and the pawl 23 for rotating the pawl 23 in the counterclockwise direction to rotate the latch 21 in the clockwise direction instead of using the first biasing means described in this embodiment, i.e., the first biasing means formed by the return springs 35 and 43 for rotating the pawl 23 in the counterclockwise direction to rotate the latch 21 in the clockwise direction.

The pawl and the rotation lever can be formed by one piece instead of forming the rotation lever 22 coaxially formed with the pawl axis with a predetermined angle relative to the pawl 23.

Figure 9:
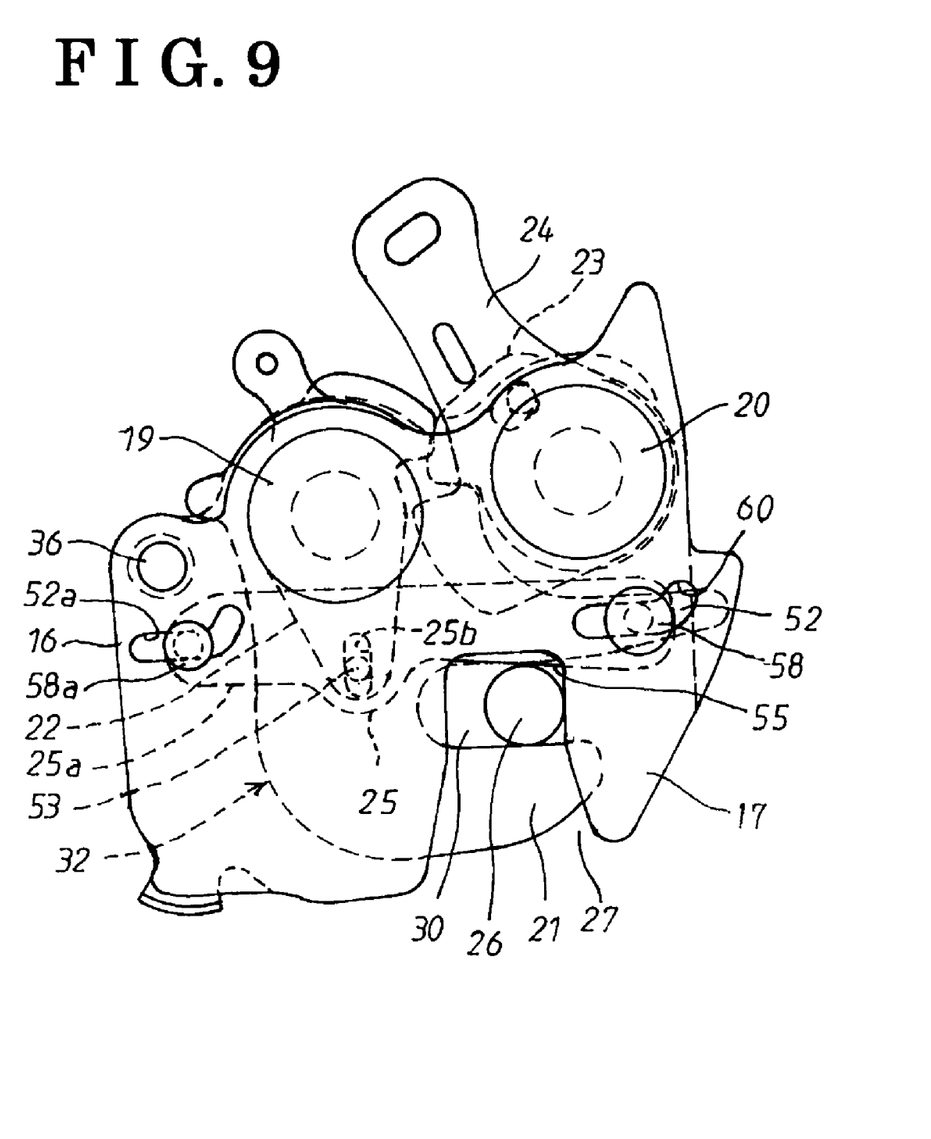
FIG. 9 is a plane view of a lock device according to another embodiment of the invention.

FIG. 9 shows another embodiment of the lock device 10 wherein the thrust plate 25 is provided with an extension 25a extending from the connecting end of the plate 25 with the rotation plate 22 and the first plate 17 is provided with a second guide portion 52a having the same shape with the guide portion 52 at a portion corresponding to the end portion of the extension portion 25a. The second guide portion 52a is loosely engaged with the end of the extension portion 25a to support the thrust plate 25 on the first plate 17. The thrust plate 25 is further provided with an elongated hole 25b at the connecting portion with the rotation plate 22 for allowing vertical movement of the connecting pin 53 caused by the rotation of the rotation plate 22. When the rotation plate 22 is rotated, the thrust plate 25 is moved in parallel with a right angle with the striker moving direction in the groove 27.

The stress received by the thrust plate 25 from the striker 26 can be dispersed on the first plate 17 not to influence on the operation of the rotation plate 22. This can also eliminate the circular groove 54 provided on the first plate 17 in the previous embodiment.

According to the embodiment structured above, the pawl 23 is rotationally supported on the base plate 16 by the pawl axis 20 arranged apart from the latch axis 19 for keeping the latch 21 to the releasable position for allowing the latch 21 to be returning to the lock release position 32 in the rotational range of the latch 21 from the lock release position 32 to the lock position 34 and prevents the latch 21 to return to the lock release position 32 by engaging with the latch 21 rotating to the release preventing position 46 after the latch 21 having been rotated to the lock position 34. The rotation plate 22 rotationally supported on the base plate 16 coaxially to the latch axis 19 is disengaged from the rotation lever 24 to rotate in the same direction with a rotation direction of the latch 21 to the release position upon the rotation of the pawl 23 from the releasable position 45 to the release preventing position 46. The thrust plate 25, which includes the inclined cam surface 55 extending in a direction crossing a direction of the striker 26 entering the entrance/retracting groove 27 and is connected to the rotation plate 22, moves in a direction so that the inclined cam surface 55 protrudes to the entrance/retracting groove 27 in cooperation with the rotation of the rotation plate 22 in response to the rotation of the latch 21 to the lock position 34. Accordingly, the striker 26 is secured between the inclined cam surface 55 and the latch 21.

By this structure, the moving distance of the thrust plate 25 can be elongated in a direction crossing the direction of striker 26 entering the groove. This can absorb any deviation of the position of the striker 26 in the direction crossing the direction of striker entering the groove or the deviation of the diameter of the striker 26 by sufficiently small pressure angle formed between the inclined cam surface 55 and the latch 21 to secure the striker 26 therein. Further, the striker 26 can be secured in the groove without causing any chattering noise, which may be generated when the striker 26 is not sufficiently secured in the groove.

According to the above-described embodiment, the rotation lever 24 is associated with the pawl 23 for relative rotation by a predetermined angle on the same axis with the pawl axis 20 and the return spring (first biasing means) 35, 43 biases the pawl 23 in the rotational direction towards the release preventing position 46 through the rotation lever 24. According to this structure, the rotation plate 22 is rotated in a rotational direction same with the rotational direction of the latch 21 towards the lock position 34 when the pawl 23 is rotated to the releasable position 45 to rotate the rotation lever 24 by a predetermined angle to the releasable position 45. Then the thrust plate 25 is retracted to release the striker 26 from the engagement with the inclined cam surface 55. The pawl 23 can be rotated smoothly with a small operation force by the rotation lever 24.

According to the embodiment disclosed above, the guide portion 52 includes a retracting area for moving the thrust plate 25 away from the opening portion of the entrance/retracting groove 27 when the rotation plate 22 is rotated in the same rotational direction with a direction towards lock position 34 of the latch 21 and the thrust plate 25 is positioned adjacent a rear end thereof. According to the foregoing construction, when the thrust plate 25 advances in response to the rotation of the rotation plate 22 to the same direction with the rotational direction of the latch 21 to the release position, the thrust plate 25 moves towards the opening portion of the entrance/retracting groove. Accordingly, a moving distance of the thrust plate 25 can be elongated in a direction crossing the direction of striker 26 entering the groove. This can absorb any deviation of the position of the striker 26 in the direction crossing the direction of striker 26 entering the groove or the deviation of the diameter of the striker 26 by sufficiently small pressure angle formed between the inclined cam surface 55 and the latch 21 to secure the striker 26 therein.

According the embodiment of the present invention, the circular groove 54 is formed on the base plate 16 coaxially with the latch axis 19 and engaged with a connection portion connecting an operation portion of the rotation plate 22 with the thrust plate 25. Thus the stress applied on the thrust plate 25 in the latch axis direction can be dispersed by receiving the stress on the base plate 16 to avoid any possible damage on the rotation plate 22 and latch axis 19.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lock device for a vehicle comprising:
    a base plate including an entrance/retracting groove that receives a striker or from which a striker is retracted;
    a latch pivotally supported on the base plate via a latch axis, the latch having a lock groove that engages with or disengages from the striker entering the entrance/retracting groove, the latch being rotatable about the latch axis, via movement of the striker, between a lock release position, in which the striker enters into the entrance/retracting groove and a lock position, in which the striker is held in the entrance/retracting groove;
    a pawl rotationally supported on the base plate via a pawl axis that is separate from the latch axis, the pawl keeping the latch in a releasable position to allow the latch to return to the lock release position in a rotational range of the latch from the lock release position to the lock position, and the pawl preventing the latch from returning to the lock release position by engaging with the latch by rotating the pawl about the pawl axis to a release preventing position after the latch has been rotated to the lock position;
    a rotation lever rotationally supported on the base plate coaxially with the pawl axis;
    a rotation plate rotationally supported on the base plate coaxially with the latch axis, the rotation plate being configured to be rotated in a same direction as a first rotational direction of the latch towards the lock position to engage with the rotation lever upon the pawl being rotated from the release preventing position to the releasable position;

a thrust plate having an inclined cam surface extending in a direction transverse to a striker entering direction adjacent a bottom surface of the entrance/retracting groove, the thrust plate being supported on the base plate via a guide portion provided on the base plate, the inclined cam surface being moved into the entrance/retracting groove via connecting the thrust plate with the guide portion provided on the base plate to secure the striker between the inclined cam surface and the latch;

first biasing means for biasing the latch in a second rotational direction to the lock release position and for biasing the pawl in a third rotational direction towards the release preventing position; and second biasing means for biasing the rotation plate in the second rotational direction towards the lock release position of the latch.

2. The lock device according to claim 1, wherein the rotation lever corresponds with the pawl for relative rotation via a predetermined angle on the same axis with the pawl axis, and wherein the first biasing means biases the pawl in the third rotational direction towards the release preventing position through the rotation lever.

3. The lock device according to claim 2, wherein the guide portion includes a retracting area into which the thrust plate is guided so as to be disposed away from an opening portion of the entrance/retracting groove when the rotation plate is rotated in the first rotational direction towards the lock position of the latch, such that the thrust plate is positioned adjacent a rear end of the entrance/retracting groove.

4. The lock device according to claim 3, wherein a the base plate includes an arcuate groove disposed coaxially with the latch axis, the arcuate groove engaging with a connection portion connecting an operation portion of the rotation plate with the thrust plate.

5. The lock device according to claim 1, wherein the guide portion includes a retracting area into which the thrust plate is guided so as to be disposed away from an opening portion of the entrance/retracting groove when the rotation plate is rotated in the first rotational direction towards the lock position of the latch, such that the thrust plate is positioned adjacent a rear end of the entrance/retracting groove.

6. The lock device according to claim 5, wherein a the base plate includes an arcuate groove disposed coaxially with the latch axis, the arcuate groove engaging with a connection portion connecting an operation portion of the rotation plate with the thrust plate.

7. The lock device according to claim. 1, wherein the base plate is fixed to one of a fixed member in a vehicle and a movable member in a vehicle, and wherein the striker is fixed the other of the fixed member and the movable member.

8. The lock device according to claim 1, wherein the latch and the pawl are aligned on a first plane, and wherein the rotation plate and the rotation lever are aligned on a second plane, the first and second planes being parallel.

9. The lock device according to claim 8, wherein the thrust plate is arranged on a third plane, which is parallel to the first and second planes.

10. The lock device according to claim 1, wherein the first biasing means includes a first return spring and a second return spring.

11. The lock device according to claim 1, wherein the second biasing means includes a third return spring.

12. The lock device according to claim 1, wherein the base plate includes a first plate member and a second plate member, and wherein the latch, the pawl, the rotation plate, and the rotation lever are sandwiched between the first and second plate members.

13. The lock device according to claim 12, wherein the first biasing means includes a first return spring and a second return spring, wherein the second biasing means includes a third return spring, and wherein the first return spring is sandwiched between the rotation plate and the first plate member.

14. The lock device according to claim 13, wherein the second and third return springs are disposed against a side face of the first plate member.

15. The lock device according to claim 13, wherein the first and third return springs are coaxial.

* * * * *